(12) United States Patent
Tanno

(10) Patent No.: US 8,773,069 B2
(45) Date of Patent: Jul. 8, 2014

(54) CHARGE/DISCHARGE CONTROL METHOD

(75) Inventor: Yoshikatsu Tanno, Fukushima (JP)

(73) Assignee: Sony Corporation (JP)

( * ) Notice: Subject to any disclaimer, the term of this patent is extended or adjusted under 35 U.S.C. 154(b) by 718 days.

(21) Appl. No.: 13/084,218

(22) Filed: Apr. 11, 2011

(65) Prior Publication Data

US 2011/0267006 A1     Nov. 3, 2011

(30) Foreign Application Priority Data

Apr. 28, 2010   (JP) ................. 2010-103237

(51) Int. Cl.
*H02J 7/00*         (2006.01)
(52) U.S. Cl.
USPC .......................................... 320/116; 320/124
(58) Field of Classification Search
USPC ......................................................... 320/116
See application file for complete search history.

(56) References Cited

U.S. PATENT DOCUMENTS

| | | | |
|---|---|---|---|
| 5,886,502 A | | 3/1999 | Higashijima |
| 6,087,807 A * | | 7/2000 | Sudo et al. .................... 320/128 |
| 6,242,890 B1 * | | 6/2001 | Sudo et al. .................... 320/128 |
| 7,592,815 B2 * | | 9/2009 | Yano ............................. 324/509 |
| 2007/0216349 A1 * | | 9/2007 | Sakaue et al. ................. 320/112 |
| 2007/0285057 A1 * | | 12/2007 | Yano ............................. 320/116 |
| 2008/0284375 A1 * | | 11/2008 | Nagaoka et al. .............. 320/116 |
| 2013/0154578 A1 * | | 6/2013 | Kawai et al. .................. 320/164 |
| 2014/0035360 A1 * | | 2/2014 | Butzmann, Stefan ....... 307/10.1 |

FOREIGN PATENT DOCUMENTS

| | | |
|---|---|---|
| JP | 2000-014035 | 1/2000 |
| JP | 2003-208926 | 7/2003 |
| JP | 3951068 | 5/2007 |
| JP | 2008-210694 | 11/2008 |
| JP | 4213624 | 11/2008 |

OTHER PUBLICATIONS

Japanese Office Action issued on Apr. 17, 2012, in connection with counterpart JP Application No. 2010-103237.

* cited by examiner

*Primary Examiner* — Yalkew Fantu
(74) *Attorney, Agent, or Firm* — Sheridan Ross P.C.

(57) ABSTRACT

A secondary battery charging method includes the step of determining whether to perform one of a first charging control method of performing constant current charging and constant voltage charging and a second charging control method of performing only the constant current charging according to information stored in a plurality of secondary batteries including a compound oxide particle with an olivine crystal structure. The first charging control method includes the steps of performing the constant current charging of the secondary batteries, performing the constant voltage charging, determining whether voltage variation amounts of the plurality of secondary batteries are a value equal to or greater than a first set value, and storing information and firstly terminating the charging. The second charging control method includes the steps of starting the constant current charging of the plurality of secondary batteries connected to each other in series, and secondly terminating the constant current charging.

5 Claims, 13 Drawing Sheets

CHARGE/DISCHARGE CONTROL METHOD

BACKGROUND OF THE INVENTION

1. Field of the Invention

The present invention relates to a battery pack and a charge control method used for the battery pack, and more particularly, to a method of controlling charging and discharging of a battery pack having battery cells using a positive electrode active material with an olivine crystal structure.

2. Description of the Related Art

In recent years, a battery pack using a lithium ion secondary battery has widely been used as a power source in a portable electronic apparatus such as a laptop personal computer, a cellular phone, and a PDA (Personal Digital Assistant). The lithium ion secondary battery has advantages such as lightness, high capacity, ease of residual capacity detection, and long life cycle.

In a lithium ion secondary battery, generally, charging is performed by a constant current and constant voltage method and the charging ends at current termination at which the fact that a current value is lowered up to a predetermined current value is detected by a charge time or a constant voltage region.

When the lithium ion secondary battery using a cobalt-based, manganese-based, or nickel-based compound oxide particle as a positive electrode active material according to the related art is charged by the constant current and constant voltage, a charge characteristic is shown in FIG. 1. When the constant current charging is performed, the voltage of the battery gradually increases, and then the current value gradually decreases when the voltage of the battery reaches a predetermined voltage. When a method of detecting the current value and terminating the charging is used, the capacity of the battery can be sufficiently used.

When the charging is terminated at a predetermined charge time, there is a possibility that the battery is exposed to a high voltage state for a long time and thus the life of the battery is shortened. When a battery pack in which a plurality of lithium ion secondary batteries is connected to each other in series is charged, a general charger charges the battery pack with a given output voltage. Therefore, a voltage balance of the respective battery may be lost. In this case, the charging is usually stopped by an overcharge protection function.

On the other hand, a battery pack is charged not by the above-mentioned constant current and constant voltage charging method but by a constant current method in order to increase the life of the battery or improve safety of overcharging. FIG. 2 shows a charge characteristic when the lithium ion secondary battery using a cobalt-based, manganese-based, or nickel-based compound oxide particle used from the past as a positive electrode active material is charged by the constant current charging. However, the constant current charging method has a problem with the charging characteristic of a battery in that a charging ratio is just about 80% of the entire capacity of the battery. In the case of the constant current charging, when the voltage of the battery reaches a predetermined voltage, the charging is terminated. Therefore, the charge time is short, while the charge capacity is smaller. Therefore, the performance of the battery may not be realized.

When the plurality of secondary batteries in which the variation in a voltage or a difference in a deterioration degree occurs is used, it is difficult to control charging and discharging and thus a burden is imposed on the secondary batteries. For example, although there are many secondary batteries of which a voltage does not reach a discharge termination voltage, the discharging may be stopped. When the secondary batteries are charged, a problem may arise in that the charging is stopped even as some secondary batteries are not fully charged. Thus, as the batteries gradually deteriorate, a usable time (that is, a discharge time) of the battery pack decreases. Moreover, since the time necessary to fully charge a battery pack and the number of charging and discharging increase, the secondary batteries may further deteriorate.

On the other hand, even when the voltage of a certain secondary battery reaches a discharge termination voltage or a certain secondary battery is fully charged, a problem may arise in that charging and discharging may continue due to the fact that the voltage of another secondary battery is a chargeable or dischargeable voltage.

In order to resolve these problems, for example, Japanese Patent No. 4213624 and Japanese Patent No. 3951068 disclose techniques for keeping a balance between secondary batteries by temporarily discharging only the secondary batteries necessary to be discharged.

SUMMARY OF THE INVENTION

However, the configurations disclosed in Japanese Patent No. 4213624 and Japanese Patent No. 3951068 have a problem in that control becomes complicated since the secondary batteries are discharged to reduce a variation between the battery capacities of the secondary batteries.

In the light of the foregoing, it is desirable to provide a battery pack, a charging/discharging control method, and a charger capable of changing a charging method according to the states of secondary batteries by determining the states of the secondary batteries using a positive electrode active material with an olivine crystal structure.

According to an embodiment of the invention, there is provided a secondary battery charging method including the step of determining whether to perform one of a first charging control method of performing constant current charging and constant voltage charging and a second charging control method of performing only the constant current charging according to information stored in a plurality of secondary batteries which includes a compound oxide particle with an olivine crystal structure as a positive electrode active material and are connected to each other in series. The first charging control method includes the steps of performing the constant current charging of the secondary batteries until the voltages of the plurality of secondary batteries connected to each other in series become a predetermined battery voltage, performing the constant voltage charging after the voltages of the secondary batteries become the predetermined battery voltage, determining whether voltage variation amounts of the plurality of secondary batteries are a value equal to or greater than a first set value within a first predetermined time by measuring the voltage variation amounts of the plurality of secondary batteries after the constant voltage charging starts, and storing information used to select the second charging control method in the secondary battery and firstly terminating the charging when it is determined that the voltage variation amount of at least one of the plurality of secondary batteries is the value equal to or greater than the first set value within the first predetermined time in the step of determining whether the voltage variation amounts of the plurality of secondary batteries are the value equal to or greater than the first set value within the first predetermined time. The second charging control method includes the steps of starting the constant current charging of the plurality of secondary batteries connected to each other in series and secondly terminating the constant current charging when the voltage variation amount of at least one of the plurality of secondary batteries is a value equal to or greater than a second set value within a second set time.

In the above-described charging control method, the first charging control method is selected in the initial use period of the secondary batteries. When the secondary batteries are charged or discharged and a variation equal to or more than a given variation occurs in the battery capacities or the battery voltages of the secondary batteries connected to each other in series, the second charging control method is selected. In the second charging control method, the charging is terminated by detecting the abrupt voltage increase in the end stage of the constant current charging, which is the charge characteristic of the positive electrode active material with the olivine crystal structure. Thus, it is possible to perform the charging so that the batteries are nearly fully charged, while suppressing the variation in the battery capacity which occurs with progress of the cycle of the charging and discharging.

According to the embodiment of the invention, it is possible to further effectively achieve a high degree of safety and long life cycle of the batteries which are the feature of the non-aqueous electrolyte battery using the compound oxide with the olivine crystal structure as the positive electrode active material.

DESCRIPTION OF THE PREFERRED EMBODIMENTS

Hereinafter, preferred embodiments (hereinafter, referred to as embodiments) of the invention will be described. The description thereof will be made in the following order.

1. First Embodiment (Exemplary Method of Controlling Charging of Charger)
2. Second Embodiment (Exemplary Method of Controlling Charging Battery Pack)
3. Third Embodiment (Example of Battery pack with Charging Control Function according to First Embodiment)

1. First Embodiment

Hereinafter, a first embodiment of the invention will be described with reference to the drawings. In the first embodiment, a first charging method will be described for a battery pack including a non-aqueous electrolyte secondary battery using a positive electrode which has a compound oxide particle with an olivine crystal structure as a positive electrode active material. This charging method is performed such that a variation in a battery voltage between a plurality of secondary batteries is detected in a constant voltage charge region of constant current and constant voltage charging, charging is stopped depending on the detection result, and a control signal is sent to a charger to change a charging control method from the next time.

1-1 Charging Method According to Embodiment of the Invention

According to the embodiment of the invention, when constant current and constant voltage charging is performed by a battery pack including a plurality of secondary batteries and a large variation occurs in the battery capacity of each secondary battery, the charging is stopped to perform charging only by constant current charging from the next charging time. In the constant current charging, a variation also occurs in the battery voltage since the variation occurs in the battery capacity. Therefore, the charging is terminated not detecting a set charge termination voltage but using a peculiar charge characteristic obtained when a compound oxide particle with an olivine crystal structure are used as a positive electrode active material.

Hereinafter, the charge characteristic when the compound oxide particle with the olivine crystal structure will be described.

Figure 1:
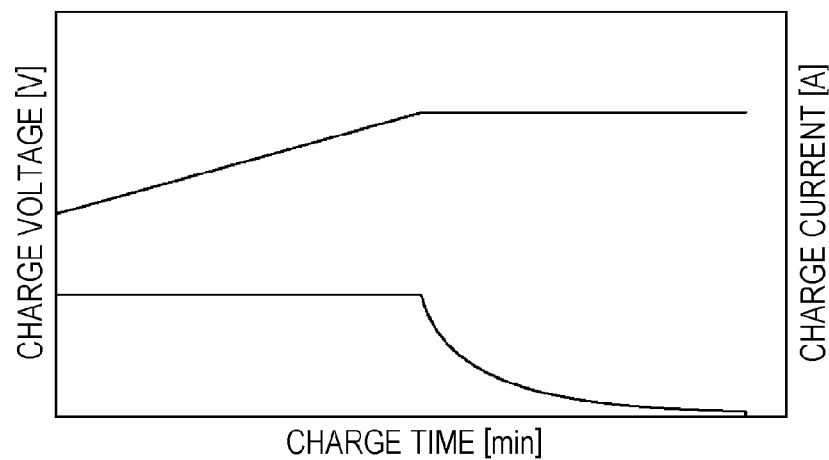
FIG. 1 is a graph illustrating a charge characteristic when performing constant current and constant voltage charging of a lithium ion secondary battery using a cobalt-based, manganese-based, or nickel-based compound oxide particle as a positive electrode active material.
Figure 2:
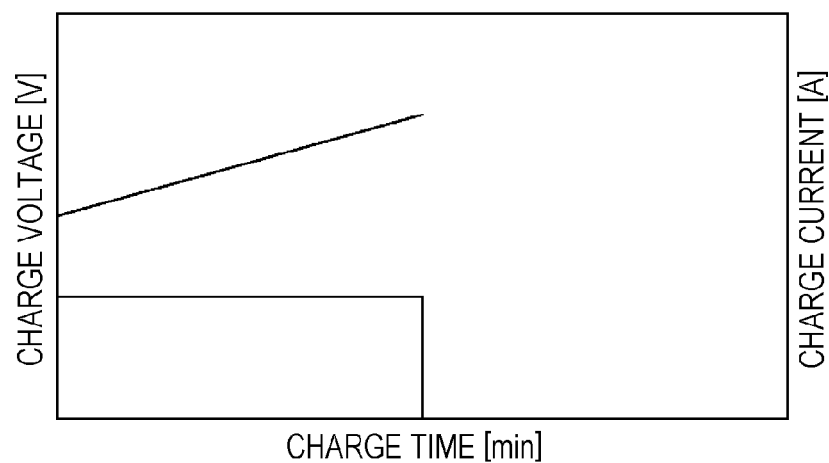
FIG. 2 is a graph illustrating a charge characteristic when performing constant current of a lithium ion secondary battery using a cobalt-based, manganese-based, or nickel-based compound oxide particle as a positive electrode active material.
Figure 3:
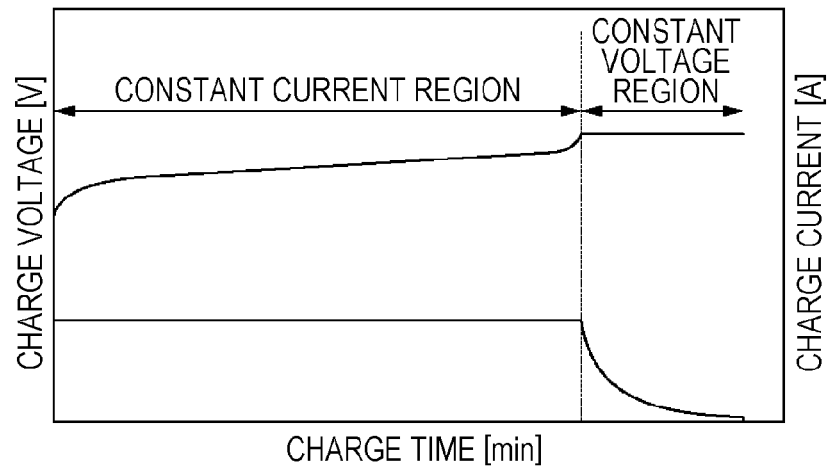
FIG. 3 is a graph illustrating a charge characteristic when performing constant current and constant voltage charging of a lithium ion secondary battery using a compound oxide particle with an olivine crystal structure as a positive electrode active material.
Figure 4:
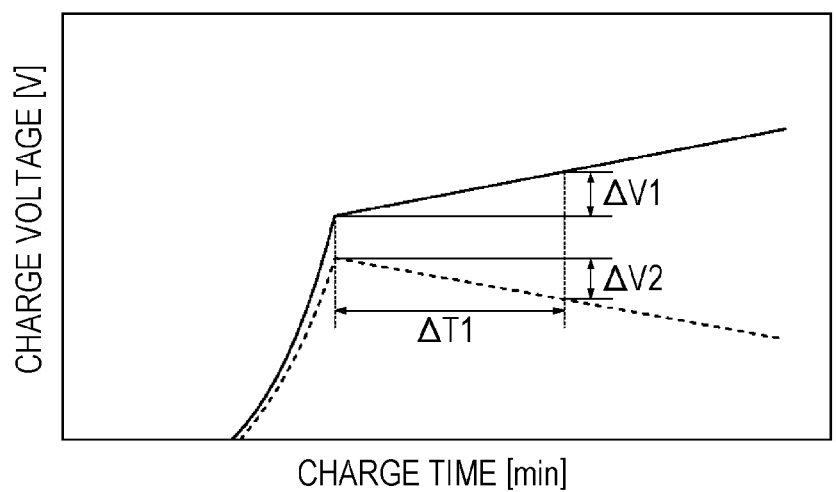
FIG. 4 is a graph illustrating a charge characteristic when performing constant voltage charging of a lithium ion secondary battery using a compound oxide particle with an olivine crystal structure as a positive electrode active material.
Figure 5:
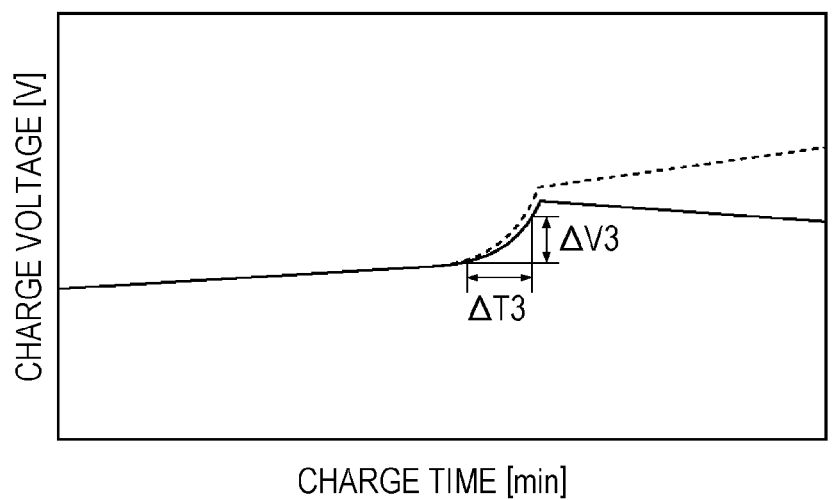
FIG. 5 is a graph illustrating a charge characteristic when performing constant current charging of a lithium ion secondary battery using a compound oxide particle with an olivine crystal structure as a positive electrode active material.

In FIG. 3, a charge characteristic is shown when a non-aqueous electrolyte battery using the compound oxide particle (hereinafter, appropriately referred to as olivine-type compound oxide particle) with an olivine crystal structure as a positive electrode active material is charged by the constant current and constant voltage charging. In FIG. 4, a charge characteristic in constant voltage charging is shown. In FIG. 5, a charge characteristic of the last period of the constant current charging is shown.

As shown in FIG. 3, the non-aqueous electrolyte battery using the olivine-type compound oxide particle as the positive electrode active material has the characteristic in which a voltage is relatively flat in the constant current charging and the voltage tends to sharply increase immediately before the change from a current to a constant voltage.

The non-aqueous electrolyte battery using the olivine-type compound oxide particle is charged up to 90% or more of the capacity of this battery in a constant current charge region. Therefore, the non-aqueous electrolyte battery using the olivine-type compound oxide particle as the positive electrode active material is charged up to the nearly full charge state in the constant current charge region.

When the olivine-type compound oxide particle is used, a voltage sharply increases during a transition period from the constant current charging to the constant voltage charging. For this reason, in a multi-series battery pack in which two or more non-aqueous electrolyte batteries are connected to each other in series, balance loss of the battery capacity occurs when charging and discharging are repeated. Thus, when the charging method is changed to the constant voltage charging, the voltage of a battery with a smaller battery capacity tends to increase and the voltage of a battery with a large battery capacity tends to decrease. This tendency becomes more considerable as the balance loss the battery capacity is larger.

On the other hand, when no balance loss occurs in the voltage, a charging current reaches a set value by the constant current and constant voltage charging according to the related art. Alternatively, the charging is terminated when a charging time reaches a set value. According to the embodiment of the invention, the charging is terminated by the constant current charging by detecting a voltage increase peculiar to the above-described olivine-type compound oxide particle.

When a given condition is satisfied in a collapse of the variation in the battery capacity or the battery voltage, the constant voltage charging ends and the charging ends only by the constant current charging from the next charging time. As shown in FIG. 4, the collapse of the variation in the battery voltage is detected by monitoring the voltage of each battery in the constant voltage charging and detecting whether a variation amount of voltage reaches a set value within a given time ($\Delta T1$). That is, it is determined whether at least one of voltage variation amounts $\Delta V1$ and $\Delta V2$ reaches the set value. Moreover, the voltage variation amounts $\Delta V1$ and $\Delta V2$ refer to the absolute value of the variation amount of voltage.

Alternatively, it may be determined using the sum value of the voltage variation amounts $\Delta V1$ and $\Delta V2$ or the average value of the voltage variation amounts $\Delta V1$ and $\Delta V2$. In particular, the variation in the voltage of the secondary batteries connected to each other in series is preferably detected by determining whether one of the absolute values of voltage variation values reaches a set value or by determining whether the average of the voltage variation values reaches the set value. When the variation amount of voltage reaches the set value within the given time ($\Delta T1$), only the constant current charging is performed from the next charging time.

For example, when the variation amount of voltage reaches the set value within a predetermined time $\Delta T2$ longer than $\Delta T1$, the charging may end at that time irrespective of a charge current value and a charge time. At this time, in the next charging, the constant voltage charging is performed after the constant current charging. Since the variation in the battery voltage between the batteries is smaller compared to the case where the variation amount of voltage reaches the set value within the given time ($\Delta T1$), the charging method is not immediately switched to only the constant current charging.

At this time, a charge mode switch flag stored in a memory of a micro controller installed inside the battery pack is set to 0 during the initial charging period. In addition, when the charge mode switch flag is 0, it is assumed that the constant current and constant voltage charging is performed. In a charger 30, the charge mode switch flag stored in the memory of the battery pack is confirmed, and charging is performed by a power reception method according to the stored charge mode switch flag.

When the balance loss of the battery voltage is large, the charging termination method is modified from the next charging time. Therefore, the charge mode switch flag stored in the memory of the micro controller installed inside the battery pack is updated. That is, for example, the charge mode switch flag 0 stored in the memory during the initial charge period is stored as the charge mode switch flag 1 when the balance loss of the battery voltage is large. In the battery pack in which the charge mode switch flag is set to 1, the charging is terminated by the constant current charging from the next charging time by detecting the voltage increase peculiar to the olivine-type compound oxide particle.

When the charge mode switch flag is set to 0 and the charging is performed by the constant current charging, an increase ($\Delta V3$) in the battery voltage and a time ($\Delta T3$) are monitored in the constant current state, as shown in FIG. 5. When the increase amount of the voltage reaches a set value within the given time ($\Delta T3$), the charger is terminated. Moreover, when the balance loss of the battery voltage further occurs, the battery pack is protected from overcharging by a protective IC installed within the battery pack, thereby realizing double protection of each battery voltage from the overcharging.

1-2 Circuit Configurations of Battery Pack and Charger

Figure 6:
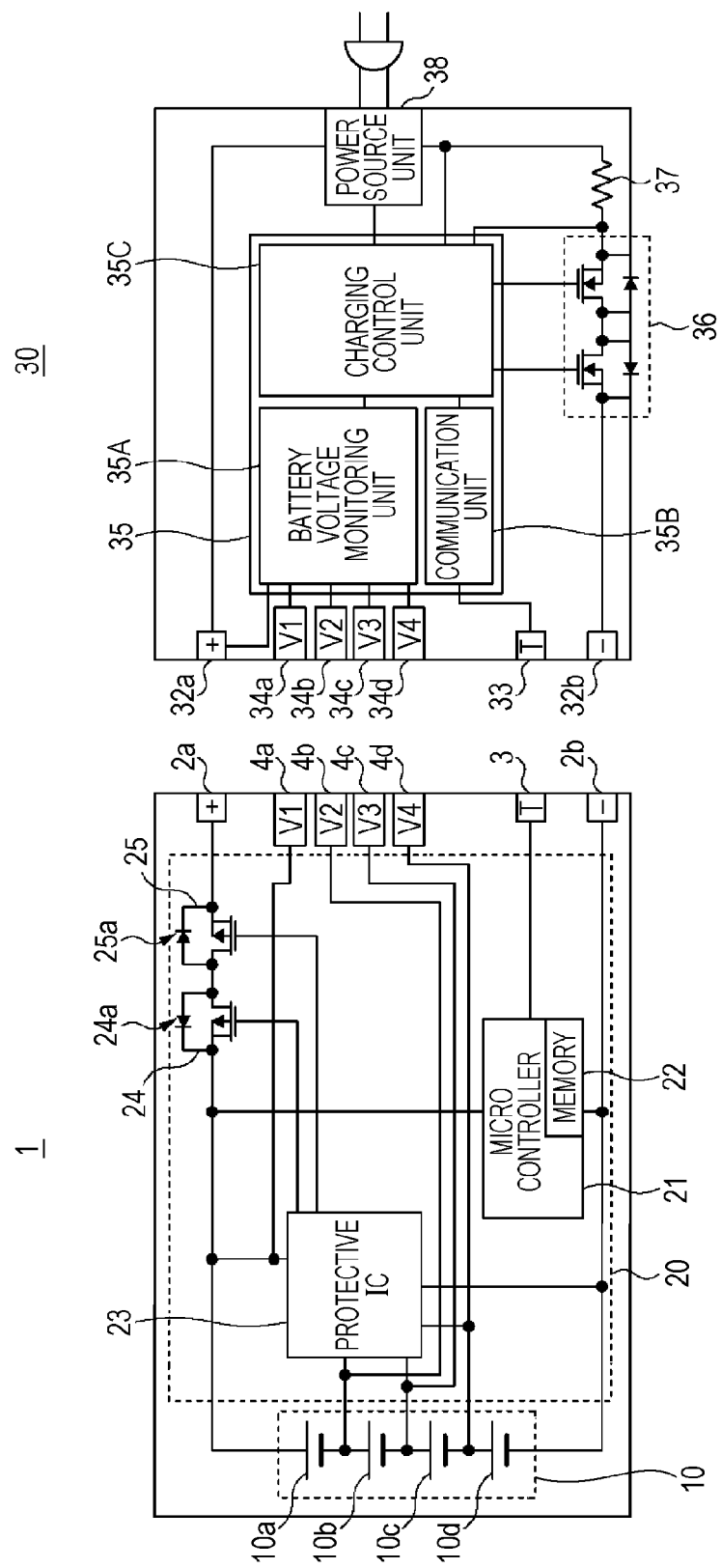
FIG. 6 is a block diagram illustrating an exemplary configuration of the circuit of a battery pack and a charger according to a first embodiment of the invention.

FIG. 6 is a circuit diagram illustrating an exemplary configuration of a battery pack 1 and a charger 30 according to the first embodiment.

Configuration of Battery Pack

As shown in FIG. 6, the battery pack 1 includes a battery assembly 10 including, for example, four secondary batteries 10a to 10d, a protective circuit 20, a positive terminal 2a, a negative terminal 2b, a communication terminal 3, and voltage monitor terminals 4a to 4d.

The battery assembly 10 is formed by connecting a plurality of secondary batteries such as lithium ion secondary batteries in series and/or in parallel. In the first embodiment of the invention, a case will be described where the four secondary batteries 10a to 10d are connected in series.

The positive terminal 2a and the negative terminal 2b are connected to a positive terminal and a negative terminal of the charger 30 or an electronic apparatus (not shown), respectively, to perform charging or discharging for the secondary batteries 10a to 10d. The communication terminal 3 communicates with the electronic apparatus to transmit, for example, the status of the battery pack to the electronic apparatus and displays the status to the electronic apparatus, as necessary. For example, an alarm lamp of the electronic apparatus is lit or the battery status may be displayed on a display unit of the electronic apparatus using a character or an icon. The battery pack 1 communicates with the electronic apparatus via the communication terminal 3 to authenticate whether the battery pack 1 is a qualified product or notifies the electronic apparatus of the residual capacities of the secondary batteries 10a to 10d.

The voltage monitor terminals 4a to 4d are used to transmit the respective battery voltages of the monitored secondary batteries 10a to 10d to the charger 30. In the first embodiment, since the charger 30 performs charging control, the battery voltage values are transmitted and controlled in the charger 30.

The protective circuit 20 includes a micro controller 21 having a memory 22, a protective IC (Integrated Circuit) 23, a discharging control FET (Field Effect Transistor) 24, and a charging control FET 25.

Since the memory 22 stores a battery charging method, that is, the charge mode switch flag described below, a charge mode is transmitted to the charger 30 via the communication terminal 3. The protective IC 23 controls the discharging control FET 24 and the charging control FET 25 to transmit a signal indicating stopping of the charging or discharging in overcharging or over-discharging of the secondary batteries 10a to 10d.

Diodes 24a and 25a are disposed between the drains and sources of the discharging control FET 24 and the charging control FET 25, respectively. The diode 24a has a polarity in a forward direction of a charge current flowing in a direction from the positive terminal 2a to the battery assembly 10 and in a backward direction of a discharge current flowing in a direction from the negative terminal 2b to the battery assembly 10. The diode 25a has a polarity in a backward direction of the charge current and in a forward direction of the discharge current.

Control signals DO and CO from the protective IC 23 are supplied to the gates of the discharging control FET 24 and the charging control FET 25, respectively. In normal charging and discharging operations, the control signal DO has a logic "L" level (hereinafter, appropriately referred to as a low level) and the discharging control FET 24 is in an ON state. Moreover, the control signal CO has the low level and the charging control FET 25 is in the ON state. Since the discharging control FET 24 and the charging control FET 25 are of a p channel type, the discharging control FET 24 and the charging control FET 25 become an ON state by a gate potential lower than a source potential by a value equal to or higher than a predetermined value. That is, in the normal charge and discharge operation, the control signals DO and CO becomes low level, and the discharging control FET 24 and the charging control FET 25 become an ON state. On the other hand, when the control signals DO and CO have a high level, the discharging control FET 24 and the charging control FET 25 become an OFF state.

The discharging control FET 24 has the diode 24a and is turned ON/OFF according to a signal from the protective IC 23, as described above. When the discharging control FET 24 is turned OFF, only the charging via the diode 24a is possible. The charging control FET 25 has the diode 25a and is turned ON/OFF according to the signal from the protective IC 23. When the charging control FET 25 is turned OFF, only the discharging via the diode 25a is possible.

Configuration of Charger

As shown in FIG. 6, the charger 30 includes a positive terminal 32a, a negative terminal 32b, a communication terminal 33, voltage monitor terminals 34a to 34d, a micro controller 35, a charging/discharging control FET 36, a current detection resistor 37, and a power source unit 38.

For example, the micro controller 35 includes a battery voltage monitoring unit 35A monitoring the voltage of each battery, a communication unit 35B communicating with the battery pack 1, and a charging control unit 35C. The charging starts when the positive terminal 2a, the negative terminal 2b, the communication terminal 3, and the voltage monitor terminals 4a to 4d of the battery pack 1 are connected to the positive terminal 32a, the negative terminal 32b, the communication terminal 33, and the voltage monitor terminals 34a to 34d of the charger 30, respectively.

In the micro controller 35, as described above, the battery voltage monitoring unit 35A monitors the voltage values of the respective secondary batteries 10a to 10d of the battery pack 1 and outputs the voltage values to the charging control unit 35C. The charging control unit 35C includes, for example, a counter (not shown) measuring a charging time. When a preset charging time passes, a control signal is transmitted, the charging/discharging control FET 36 is turned OFF, and then the charging is terminated. When a charging current value is monitored from the current detection resistor 37, the battery becomes a nearly full charge state, and the charging current value becomes equal to or less than a predetermined value, similarly, the control signal is also transmitted, the charging/discharging control FET 36 is turned OFF, and the charging is terminated.

The charging control unit 35C detects a variation amount ($\Delta V1$, $\Delta V2$, and the like in FIG. 4) of battery voltage within a given time in the constant voltage charging region, when the constant current and constant voltage charging is performed. When the variation amount of the battery voltage exceeds the set value within the given time, the charging control unit 35C determines that the battery capacity and the battery voltage between the plurality of secondary batteries become irregular, transmits a control signal, and turns off the charging/discharging control FET 36 to terminate the charging. In addition, the charging control unit 35C transmits a signal to the battery pack 1 via the communication unit 35B, updates the charge mode switch flag=0 stored in advance in the memory 22 of the battery pack 1 so that the charge mode switch flag is equal to 1, and then stores the updated charge mode switch flag. In addition, the charging control unit 35C monitors the charge current value from the current detection resistor 37, transmits a control signal, when overcurrent occurs, and turns off the charging/discharging control FET 36 to terminate the charging.

In addition, the charging control unit 35C detects the variation amount ($\Delta V3$ and the like in FIG. 5) of battery voltage within a given time, when performing the constant current charging, after the charge mode switch flag becomes 1. When the variation amount of battery voltage exceeds a set value within the given time, the charging control unit 35C determines that the battery pack becomes a nearly full charge state, transmits a control signal, and turns off the charging/discharging control FET 36 to terminate the charging. In addition, when starting the charging, the charging control unit 35C reads the charge mode switch flag stored in the memory 22 of the battery pack 1 via the communication unit 35B and controls the charging according to the charge mode switch flag.

1-3 Charging Control Method

Figure 7:
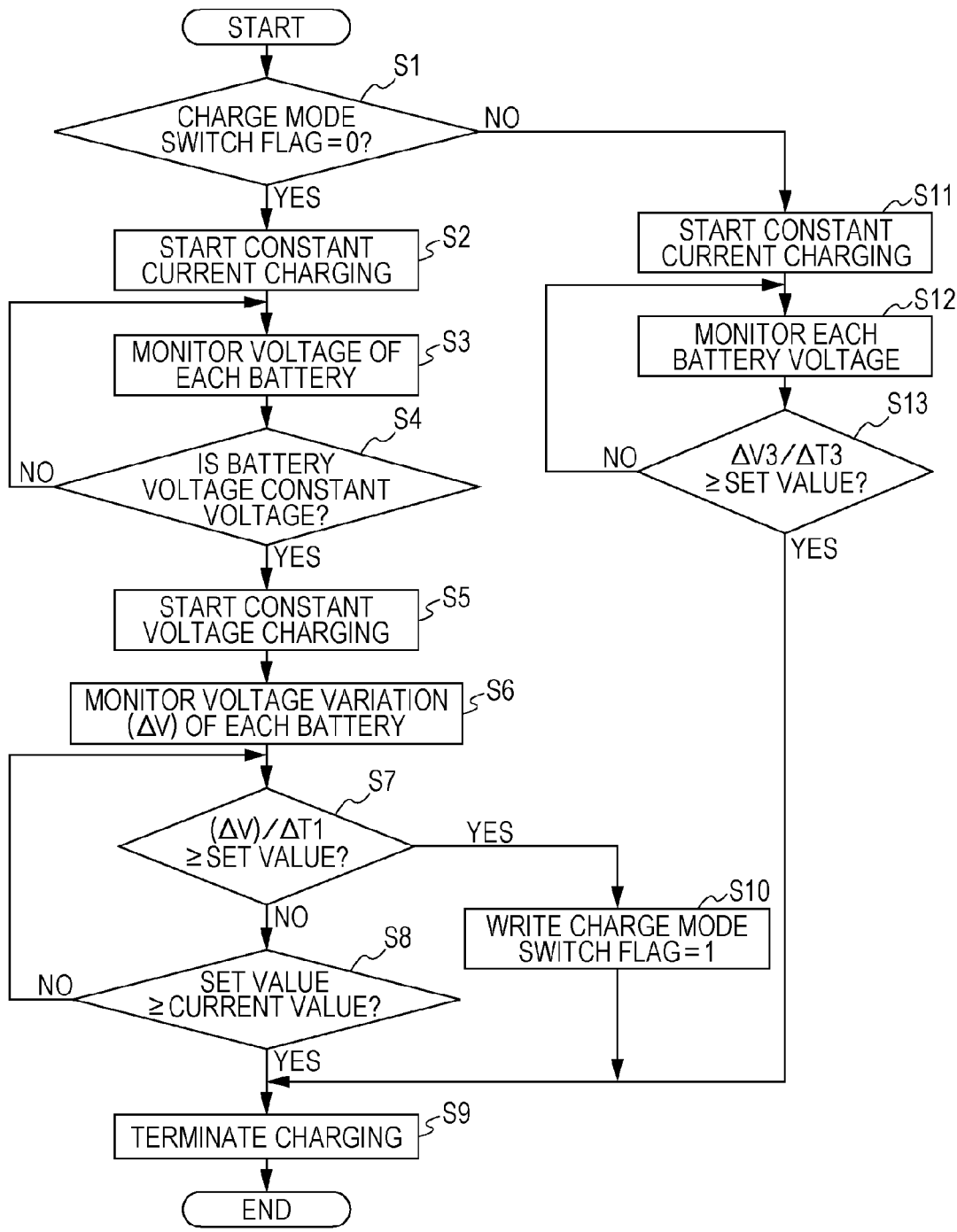
FIG. 7 is a flowchart illustrating an example of a charging method according to the first embodiment.

FIG. 7 is a flowchart illustrating a charging method according to the first embodiment. Hereinafter, the operation of the battery pack 1 when the charging is performed will be described with reference to FIG. 7 according to the first embodiment. The charging control described below is performed by the micro controller 35 of the charger.

The charging starts when the positive terminal 2a, the negative terminal 2b, the communication terminal 3, and the voltage monitor terminals 4a to 4d of the battery pack 1 are connected to the positive terminal 32a, the negative terminal 32b, the communication terminal 33, and the voltage monitor terminals 34a to 34d of the charger 30, respectively.

After the charging starts, the charge mode switch flag written in the memory 22 of the micro controller 21 of the battery pack 1 is read to the communication unit 35B of the micro controller 35 of the charger 30 in step S1. Since the variation in the battery capacity or the battery voltage between the secondary batteries is small in the initial state, for example, the charge mode switch flag=0 is written to the memory 22 of the micro controller 21 of the battery pack 1. In step S1, it is determined whether the charge mode switch flag is 0. When it is determined that the charge mode switch flag is 0 in step S1, it is recognized that the constant current and constant voltage charging is performed and the process proceeds to step S2.

When it is determined that the charge mode switch flag is 0 in step S1, the variation in the battery capacity or the battery voltage of the secondary batteries 10a to 10d is small and the constant current and constant voltage charging is performed in the battery pack 1. In step S2, the constant current charging starts. At this time, the charging control unit 35C monitors the current using the current detection resistor 37 of the charger 30 and the micro controller 35 counts the time from the start of the constant current charging, as necessary. On the other hand, when it is determined that the charge mode switch flag is not 0 in step S1, the process proceeds to step S11.

In step S3, the battery voltage monitoring unit 35A of the micro controller 35 monitors the voltages applied to the voltage monitor terminals 34a to 34d of the charger 30 connected to the voltage monitor terminals 4a to 4d of the battery pack 1. The monitoring of the voltages is performed at a predetermined time interval.

In step S4, it is determined whether the voltage of each secondary battery is a constant voltage (for example, an upper limit voltage is 3.6 V/cell). When it is determined that the voltage of each secondary battery is the constant voltage in step S4, the process proceeds to step S5. On the other hand, when it is determined that the voltage of each secondary battery is not the constant voltage in step S4, the process returns to step S3 and the constant current charging continues. In step S4, it is determined whether the entire voltage of the secondary batteries 10a to 10d of the battery pack 1 which includes four secondary batteries 10a to 10d, as in FIG. 6, that is, 3.6 V×4 is equal to 14.4 V. Thus, the constant current charging can be terminated without considering the variation in the battery voltage of each of the secondary batteries 10a to 10d.

When it is determined that the voltage of each secondary battery or the voltage of the battery pack is a constant voltage in step S4, the process proceeds to step S5 and the constant voltage charging starts. At this time, the charging control unit 35C monitors the current using the current detection resistor 37 of the charger 30 and the micro controller 35 counts the time from the start of the constant current charging, as necessary. When the charge time is continuously counted from the start of the constant current charging, it is not necessary to count the time from the start of the constant voltage charging.

In step S6, the micro controller 35 monitors the voltage of each of the secondary batteries 10a to 10d via the voltage monitor terminals 4a to 4d and monitors a voltage variation $\Delta V$ ($\Delta V1$ or $\Delta V2$, or a difference between $\Delta V1$ and $\Delta V2$ in FIG. 4) within the predetermined time $\Delta T1$. Hereinafter, the variation amount of voltage in the constant voltage region is appropriately called $\Delta V$ irrespective of the number of secondary batteries.

In step S7, it is determined whether the voltage variation $\Delta V$ from the start of the constant voltage charging of each of the secondary batteries 10a to 10d exceeds the set value without the predetermined time $\Delta T1$, that is, a relation of "$\Delta V/\Delta T1 \geq$ the set value" is satisfied. The predetermined time $\Delta T1$ may be a predetermined time from the start of the constant voltage charging or may be a predetermined time which does not include the start time of the constant voltage charging. When it is determined that the relation of "$\Delta V/\Delta T1 \geq$ the set value" is not satisfied in step S7, the process proceeds to step S8. On the other hand, when it is determined that the relation of "$\Delta V/T1 \geq$ the set value" is satisfied in step S7, the battery capacities or the battery voltages of the secondary battery 10a to 10d become irregular, and then the process proceeds to step S10. Then, the charge mode switch flag=1 is stored in the memory 22 of the battery pack 1 via the communication unit 35B. Next, the process proceeds to step S9 and the charging is terminated.

In step S8, it is determined whether the charge current is equal to or less than a predetermined set value. When the charge current is equal to or less than the predetermined set value in step S8, it is considered that the battery pack 1 becomes a nearly full charge state and the process proceeds to step S9. Then, the output from the charger 30 is stopped to terminate the charging of the battery pack 1. When the charge current is not equal to or less than the predetermined set value in step S8, the process returns to step S7 and the constant voltage charging continues.

When the charge mode switch flag of 1 is written to the memory 22 of the micro controller 21 of the battery pack 1 in step S10, it is determined that the charge mode switch flag is not 0 in step S1. In this case, it is recognized that the charging method performs only the constant current charging, and thus the process proceeds to step S11 to start the constant current charging. When the constant current charging starts in step S11, the micro controller 35 counts the time.

In step S12, the battery voltage monitoring unit 35A of the micro controller 35 monitors the voltage applied to the voltage monitor terminals 34a to 34d of the charger 30 connected to the voltage monitor terminals 4a to 4d of the battery pack 1. In addition, the voltage variation $\Delta V3$ is monitored within the predetermined time $\Delta T3$.

In step S13, it is determined whether the voltage variation $\Delta V3$ exceeds the set value within the predetermined time $\Delta T3$, that is, a relation of "$\Delta V3/\Delta T3 \geq$ the set value" is satisfied. Moreover, the predetermined time $\Delta T3$ is preferably a very short predetermined time which does not include the start time of the constant voltage charging in order to detect a sharp voltage increase during the last period of the constant current charging which is the charge characteristic of the non-aqueous electrolyte battery using the olivine-type oxide particle as the positive electrode active material. The reason for setting the very short predetermined time is to detect not the variation amount of voltage from the start time of the constant voltage charging but the sharp voltage increase. Therefore, the predetermined time $\Delta T3$ is preferably set within, for example, 30 seconds. When it is determined that the relation of "$\Delta V3/\Delta T3 \geq$ the set value" is not satisfied in step S13, the process returns to step S12 and the constant current charging continues. On the other hand, when it is determined that the relation of "$\Delta V3/\Delta T3 \geq$ the set value" is satisfied in step S13, the last period of the constant current charging is determined and the process proceeds to step S9 to terminate the charging.

1-4 Modified Example of Charging Control Method

The charging control method described with reference to the flowchart in FIG. 7 is a method of determining the variation in the battery capacity between the secondary batteries by detecting the voltage variation in the constant voltage charging region and performing only the constant current charging. When the voltage variation of the secondary battery is equal to or greater than the set value within the predetermined time in the constant voltage charging region, the charging is terminated by a charge time or a charge current value.

Figure 8:
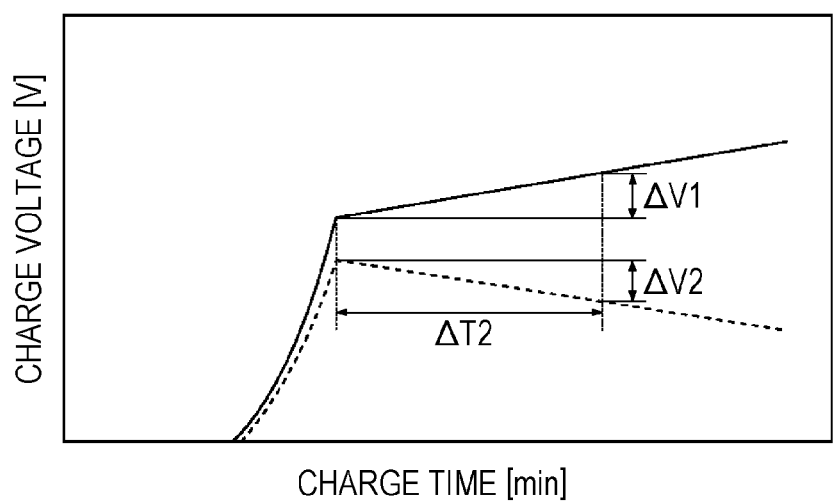
FIG. 8 is a graph illustrating a charge characteristic when performing constant voltage charging of a lithium ion secondary battery using a compound oxide particle with an olivine crystal structure as a positive electrode active material.

In a modified example of the charging control method, even when the battery voltage is not varied by a value equal to or greater than the set value within the time $\Delta T1$ in the constant voltage charging region of the charging method described in the first embodiment but the battery voltage is varied by a value equal to or greater than the set value within a time $\Delta T2$ longer than $\Delta T1$, as shown in FIG. 8, the charging is terminated. At this time, since the battery voltage is not varied by a value equal to or greater than the set value within the time $\Delta T1$, only the charging is terminated in the state where the charge mode switch flag is 0. Thus, the variation in the voltage can be configured so as to be rarely accelerated.

Figure 9:
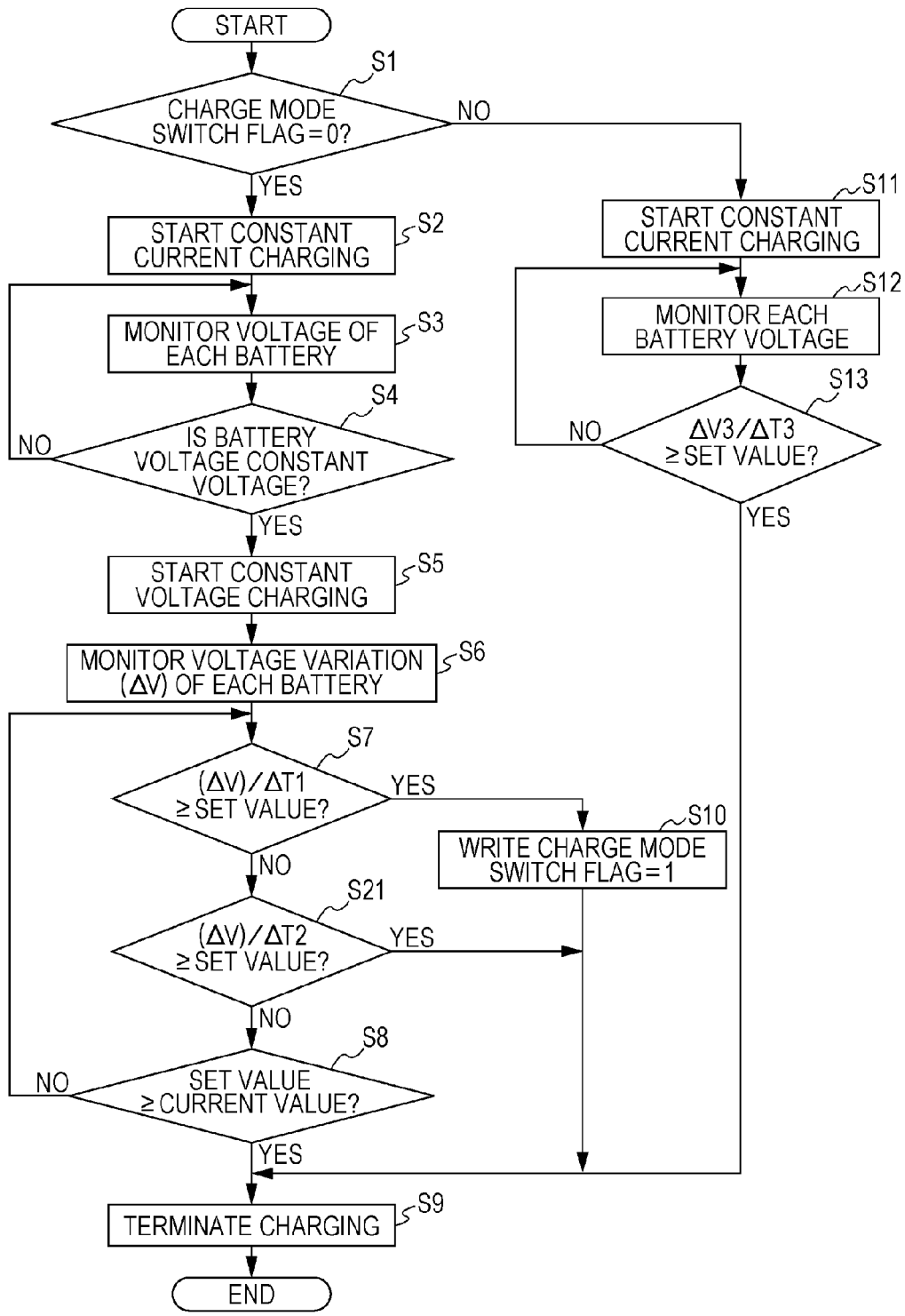
FIG. 9 is a flowchart illustrating another example of the charging method according to the first embodiment.

This charging method will be described with reference to the flowchart in FIG. 9. In the flowchart of FIG. 9, the same reference numerals are given to the same steps as those of the flowchart in FIG. 7. Hereinafter, only steps different from the steps of the flowchart in FIG. 7 will be described.

In the flowchart in FIG. 9, step S21 of monitoring the voltage variation $\Delta V$ ($\Delta V1$ or $\Delta V2$, or a difference between $\Delta V1$ and $\Delta V2$ in FIG. 4) within the predetermined time $\Delta T2$ ($\Delta T2 > \Delta T1$) is provided between step S7 and step S8. In step S21, the micro controller 35 monitors the voltage of each of the secondary batteries 10a to 10d via the voltage monitor terminals 4a to 4d and determines whether a relation of "$\Delta V/\Delta T2 \geq$ a set value" is satisfied. When the micro controller 35 determines that the relation of "$\Delta V/\Delta T2 \geq$ the set value" is satisfied in step S7, the process proceeds to step S9 and the charging is terminated. At this time, the charge mode switch flag of 0 is maintained. On the other hand, when the relation of "$\Delta V/\Delta T2 \geq$ the set value" is not satisfied in step S7, the process proceeds to step S8.

Thus, a high degree of safety and a long life cycle of the battery, which are the characteristics of the non-aqueous battery using the compound oxide with the olivine crystal structure as the positive electrode active material, can be effectively achieved by setting the charge termination conditions step by step. Moreover, the battery can be charged up to a nearly full charge state by the constant current charging while suppressing the variation in the battery capacity. Therefore, even when the variation in the battery capacity occurs, the overcharging can be suppressed to be as small as possible.

Moreover, it is possible to shorten the charge time of the battery pack using the positive electrode active material having the olivine structure. Even when the deterioration of the battery pack is extremely progressed, it is possible to use both the charging termination detection and the overcharge protection function of the protective IC 23 of the battery pack according to the embodiment of the invention. Therefore, the safety against the overvoltage of the battery can be further enhanced.

In the first embodiment, the charger controls the charging. Therefore, the secondary battery with no protective circuit may be used instead of the battery pack 1 and the charger 30 may serve as an electronic apparatus with a charging function. In this case, it is necessary for the electronic apparatus to perform the discharging control.

2. Second Embodiment

Hereinafter, a second embodiment of the invention will be described with reference to the drawings. In this second embodiment, the charging control of the first embodiment is performed within the battery pack 1.

2-1 Circuit Configurations of Battery Pack and Charger

Figure 10:
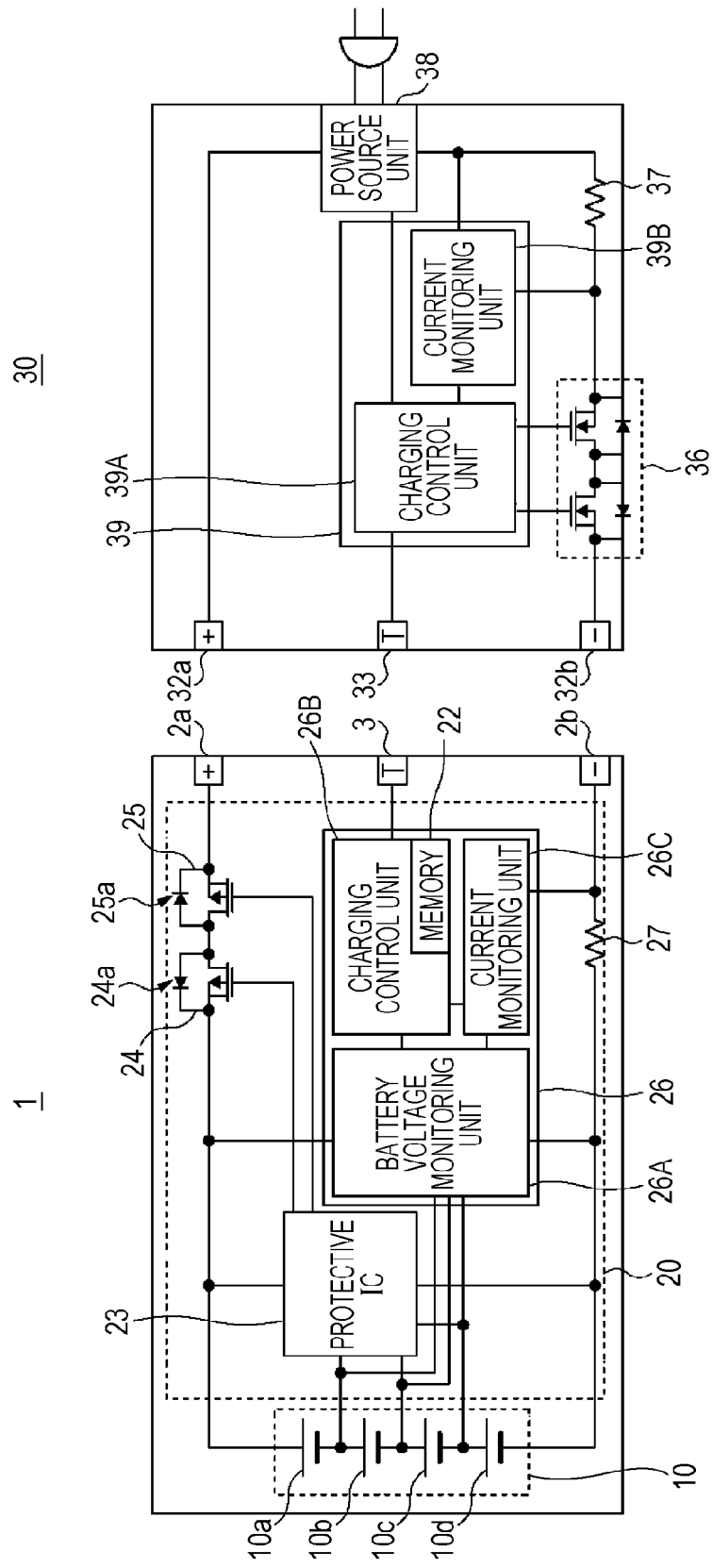
FIG. 10 is a block diagram illustrating an exemplary configuration of the circuit of a battery pack and a charger according to a second embodiment of the invention.

FIG. 10 is a circuit diagram illustrating exemplary configurations of the battery pack 1 and the charger 30 according to the second embodiment. Differences from that of the first embodiment will be described.

Configuration of Battery Pack

As shown in FIG. 10, the battery pack 1 includes a battery assembly 10 including, for example, four secondary batteries 10a to 10d, a protective circuit 20, a positive terminal 2a, a negative terminal 2b, and a communication terminal 3.

The protective circuit 20 includes a micro controller 26 having a memory 22, a protective IC 23, a discharging control FET 24, and a charging control FET 25.

For example, the micro controller 26 includes a battery voltage monitoring unit 26A monitoring the voltage of each battery, a charging control unit 26B, and a current monitoring unit 26C. The battery voltage monitoring unit 26A is the same as the battery voltage monitoring unit 35A of the first embodiment of the invention except that the battery voltage monitoring unit 26A directly monitors the voltage value of each of the secondary batteries 10a to 10d and outputs the voltage values to the charging control unit 26B. The current monitoring unit 26C monitors the current value from the current detection resistor 27 and outputs the current value to the charging control unit 26B.

The charging control unit 26B is the same as the charging control unit 35C of the first embodiment except that the charging control unit 26B monitors the voltages of the secondary batteries 10a to 10d input from the current monitoring unit 26C, when the secondary batteries 10a to 10d are charged, and the current value input from the current monitoring unit 26C, and then transmits charging control signals corresponding to the voltage values and the current value to the charger 30 via the communication terminal 3.

Configuration of Charger

As shown in FIG. 10, the charger 30 includes a positive terminal 32a, a negative terminal 32b, a communication terminal 33, a micro controller 39, a charging/discharging control FET 36, a current detection resistor 37, and a power source unit 38.

The micro controller 39 includes a charging control unit 39A and a current monitoring unit 39B. The charging control unit 39A outputs a control signal based on the charging control signal input from the battery pack 1, turns OFF the charging/discharging control FET 36, and terminates the charging. The current monitoring unit 39B monitors the charging current value from the current detection resistor 37. Even when the batteries are fully charged and the charging current reaches a value equal to or less than a predetermined value, the current monitoring unit 39B transmits the same control signal, turns OFF the charging/discharging control FET 36, and terminates the charging.

2-2 Charging Control Method

Figure 11:
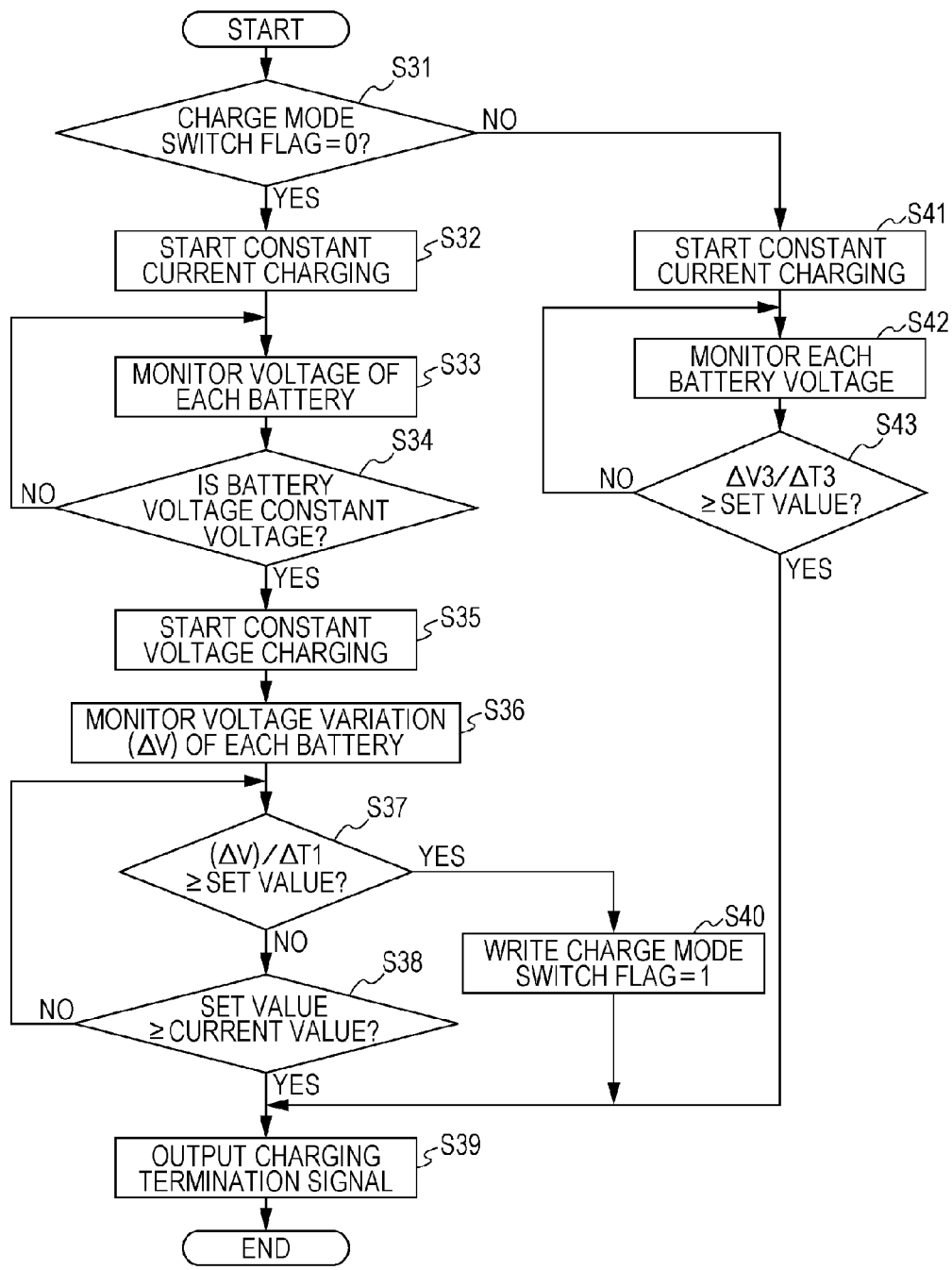
FIG. 11 is a flowchart illustrating an example of a charging method according to the second embodiment.

FIG. 11 is a flowchart illustrating a charging method according to the second embodiment. Hereinafter, the operation of the battery pack 1 when the charging is performed will be described with reference to FIG. 11 according to the second embodiment. The micro controller 26 of the battery pack 1 determines the charging control according to the second embodiment. When the batteries are charged, the control is performed by transmitting the charging control signal from the micro controller 26 of the battery pack 1 to the micro controller 39 of the charger 30.

When the positive terminal 2a, the negative terminal 2b, and the communication terminal 3 of the battery pack 1 are connected to the positive terminal 32a, the negative terminal 32b, and the communication terminal 33 of the charger 30, respectively, the charging starts.

After the charging starts, the charge mode switch flag written in the memory 22 of the micro controller 26 of the battery pack 1 is read to the micro controller 26 in step S31. Since the variation in the battery capacity or the battery voltage between the secondary batteries is small in the initial state, for example, the charge mode switch flag=0 is written to the memory 22 of the micro controller 21 of the battery pack 1. In step S31, it is determined whether the charge mode switch flag is 0. When it is determined that the charge mode switch flag is 0 in step S31, it is recognized that the constant current and constant voltage charging is performed and the process proceeds to step S32.

When it is determined that the charge mode switch flag is 0 in step S31, the constant current and constant voltage charging is performed in the battery pack 1, as in the first embodiment. In step S32, the constant current charging starts. At this time, the charging control unit 26B monitors the current using the current detection resistor 27 of the battery pack 1 and the micro controller 26 counts the time from the start of the constant current charging, as necessary. On the other hand, when it is determined that the charge mode switch flag is not 0 in step S31, the process proceeds to step S41.

In step S33, the battery voltage monitoring unit 26A of the micro controller 26 directly monitors the voltages of the secondary batteries 10a to 10d.

In step S34, it is determined whether the voltage of each secondary battery is a constant voltage. When it is determined that the voltage of each secondary battery is the constant voltage or the voltage of the battery pack is the constant voltage in step S34, the process proceeds to step S35. On the other hand, when it is determined that the voltage of each secondary battery or the voltage of the battery pack is the constant voltage is not the constant voltage in step S34, the process returns to step S33 and the constant current charging continues.

In step S35, the constant voltage charging starts. At this time, the charging control unit 26B monitors the current using the current detection resistor 27 of the battery pack 1 and the micro controller 26 counts the time from the start of the constant current charging, as necessary.

In step S36, the micro controller 26 directly monitors the voltage of each of the secondary batteries 10a to 10d and monitors the voltage variation $\Delta V$ within the predetermined time $\Delta T1$.

In step S37, it is determined whether the relation of "$\Delta V/\Delta T1 \geq$ the set value" is satisfied. When it is determined that the relation of "$\Delta V/\Delta T1 \geq$ the set value" is not satisfied in step S37, the process proceeds to step S38. On the other hand, when it is determined that the relation of "$\Delta V/\Delta T1 \geq$ the set value" is satisfied in step S37, the process proceeds to step S40. The charging control unit 26B stores the charge mode switch flag=1 in the memory 22 of the battery pack 1. Next, the process proceeds to step S39 and the charging is terminated.

In step S38, it is determined whether the charge current is equal to or less than a predetermined set value. When the charge current is equal to or less than the predetermined set value in step S38, it is considered that the battery pack 1 becomes a nearly full charge state and the process proceeds to step S39. A control signal is transmitted from the micro controller 26 of the battery pack 1 to the charger 30 so that the charging is stopped. The micro controller 39 of the charger 30 stops the output from the charger 30 by outputting the control signal to turn off the charging/discharging control FET 36 and terminates the charging of the battery pack 1. When the charge current is not equal to or less than the predetermined set value in step S38, the process returns to step S37 and the constant voltage charging continues.

When the charge mode switch flag of 1 is written to the memory 22 of the micro controller 26 of the battery pack 1 in step S40, it is determined that the charge mode switch flag is not 0 in step S31. In this case, it is recognized that the charging method performs only the constant current charging, and thus the process proceeds to step S41. In addition, the control signal is transmitted from the micro controller 26 of the battery pack 1 to the micro controller 39 of the charger 30, and then the constant current charging starts. When the constant current charging starts in step S41, the micro controller 39 counts the time.

In step S42, the micro controller 26 of the battery pack 1 directly monitors the voltages of the secondary batteries 10a to 10d. In addition, the voltage variation $\Delta V3$ is monitored within the predetermined time $\Delta T3$.

In step S43, it is determined whether a relation of "$\Delta V3/\Delta T3 \geq$ the set value" is satisfied. Moreover, as in the first embodiment, the predetermined time $\Delta T3$ is preferably a very short predetermined time which does not include the start time of the constant voltage charging. When it is determined that the relation of "$\Delta V3/\Delta T3 \geq$ the set value" is not satisfied in step S43, the process returns to step S42 and the constant current charging continues. On the other hand, when it is determined that the relation of "$\Delta V3/\Delta T3 \geq$ the set value" is satisfied in step S43, the last period of the constant current charging is determined and the process proceeds to step S39. Then, a control signal is transmitted from the micro controller 26 of the battery pack 1 to the charger 30 so that the charging is terminated. In addition, the micro controller 39 of the charger 30 stops the output from the charger 30 by outputting the control signal to turn off the charging/discharging control FET 36 and terminates the charging of the battery pack 1.

2-3 Modified Example of Charging Control Method

Figure 12:
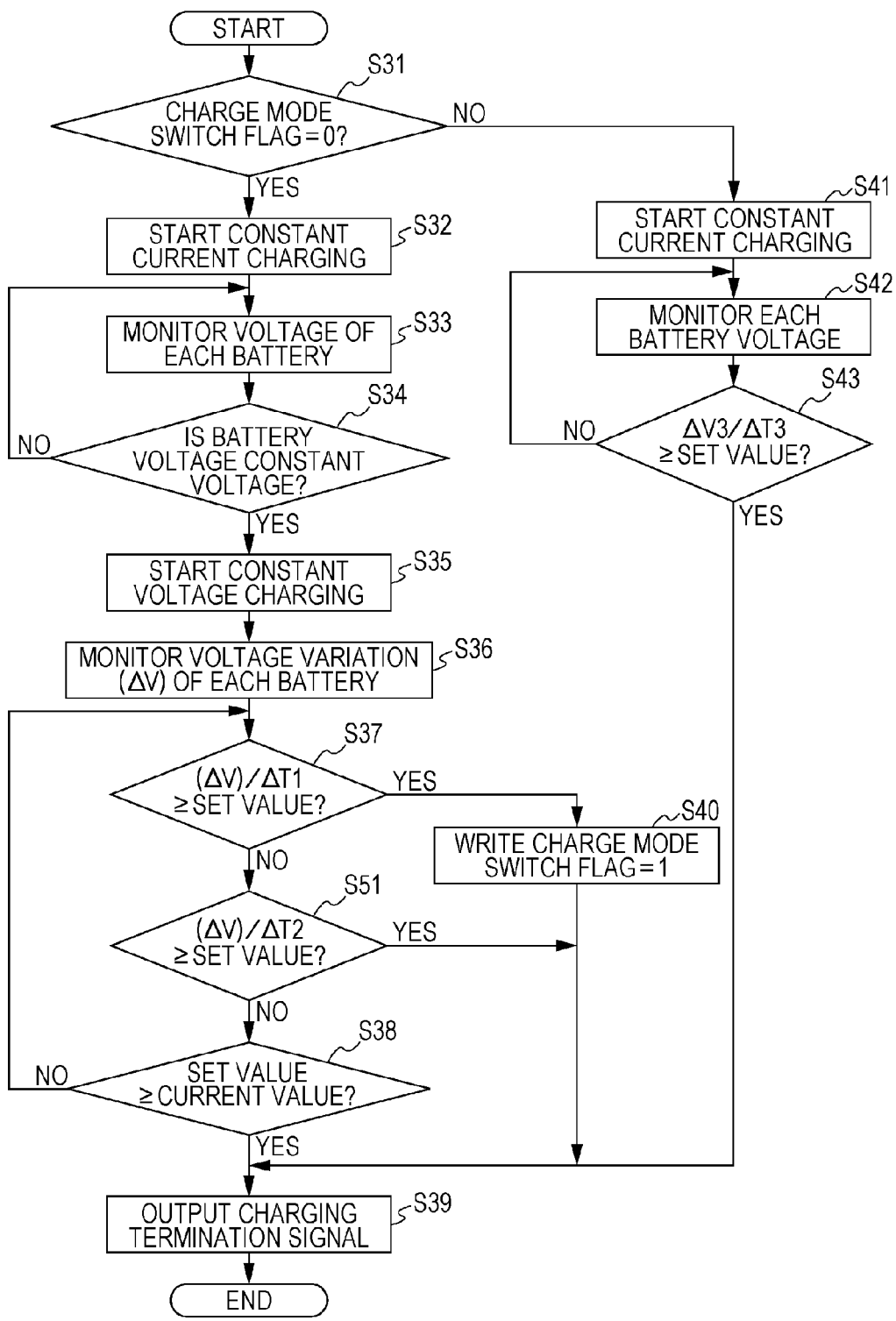
FIG. 12 is a flowchart illustrating another example of the charging method according to the second embodiment.

In a charging control method of the flowchart in FIG. 12, the charge determination condition is set step by step as in the charging method shown in FIG. 9.

In the charging method shown in FIG. 12, as in the modified example of the first embodiment, step S51 is provided between step S37 and step S38. When the battery voltage is varied by a value equal to or greater than the set value within a time $\Delta T2$ longer than $\Delta T1$, the charging is terminated. At this time, since the battery voltage is not varied by a value equal to or greater than the set value within the time $\Delta T1$, only the charging is terminated in the state where the charge mode switch flag is 0. Thus, the variation in the voltage can be configured so as to be rarely accelerated.

Even when the battery pack 1 controls the charging, the charge termination condition is set step by step, as in the first embodiment. Therefore, safety and the battery characteristic can be maintained.

3. Third Embodiment

The battery pack 1 controlling the charging in the first and second embodiments of the invention will be described according to a third embodiment.

The battery pack 1 includes the secondary batteries using the olivine-type compound oxide particle as the positive electrode active material. Hereinafter, the configuration of the secondary battery will be described.

3-1 Configuration of Secondary Battery

Figure 13:
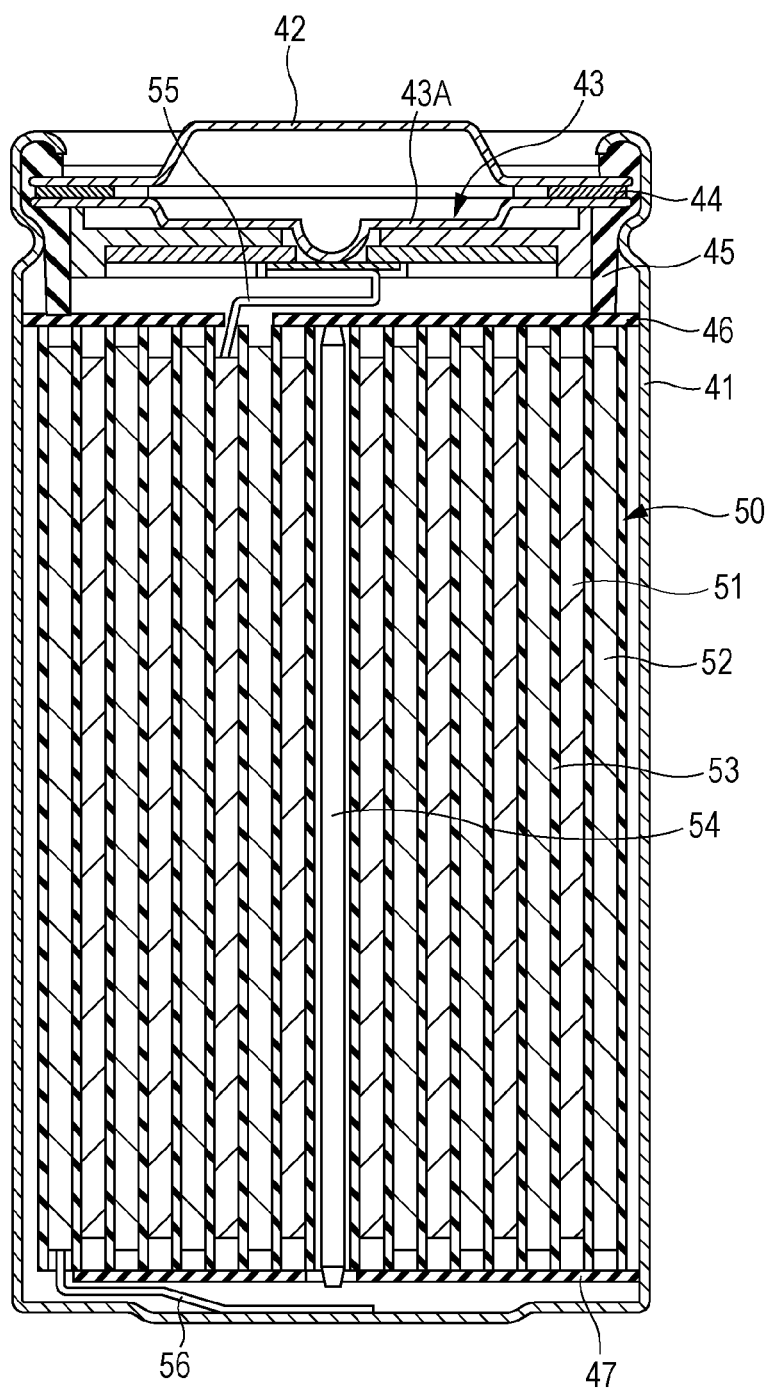
FIG. 13 is a sectional view illustrating an exemplary configuration of a secondary battery according to an embodiment of the invention.

FIG. 13 is a sectional view illustrating a non-aqueous electrolyte battery (hereinafter, appropriately referred to as a secondary battery) according to an embodiment of the invention. This battery is, for example, a lithium ion secondary battery.

As shown in FIG. 13, the secondary battery has a so-called cylindrical shape and includes a wound electrode body 50 formed by winding a strip-shaped positive electrode 51 and a strip-shaped negative electrode 52 with a separator 53 interposed therebetween inside a battery can 41. The battery can 41 is formed of, for example, iron (Fe) plated with nickel (Ni). One end of the battery can 41 is closed and the other end thereof is opened. Inside the battery can 41, a pair of insulation plates 46 and 47 is disposed vertically with respect to a wound circumferential surface with the wound electrode body 50 interposed therebetween.

A battery cover 42, a safety valve mechanism 43 installed in the inside of the battery cover 42, and a heat sensitive resistance element (positive temperature coefficient: PCT element) 16 are fitted to an open end portion of the battery can 41 with an insulation sealing gasket 45 interposed therebetween, so that the inside of the battery can 41 is hermetically sealed. The battery cover 42 is made of, for example, the same material as that of the battery can 41.

The safety valve mechanism 43 is electrically connected to the battery cover 42 through the heat sensitive resistance element 44. Therefore, when the internal pressure of the battery is equal to or greater than a given pressure due to internal short-circuiting or external heating, a disk plate 43A is reversed to cut off the electric connection between the battery cover 42 and the wound electrode body 50. When the temperature rises, the heat sensitive resistance element 44 is configured to restrict the current by an increase of a resistance value and prevent abnormal heat generation caused due to a high current. The insulation sealing gasket 45 is made of, for example, an insulation material, and asphalt is applied to the surface of the insulation sealing gasket 45.

For example, the wound electrode body 50 is wound about a center pin 54. A positive electrode lead 55 made of aluminum (Al) or the like is connected to the positive electrode 51 of the wound electrode body 50 and a negative electrode lead 56 made of nickel (Ni) is connected to the negative electrode 52. The positive electrode lead 55 is welded to the safety valve mechanism 43 to be electrically connected to the battery cover 42 and the negative electrode lead 56 is welded and electrically connected to the battery can 41.

Figure 14:
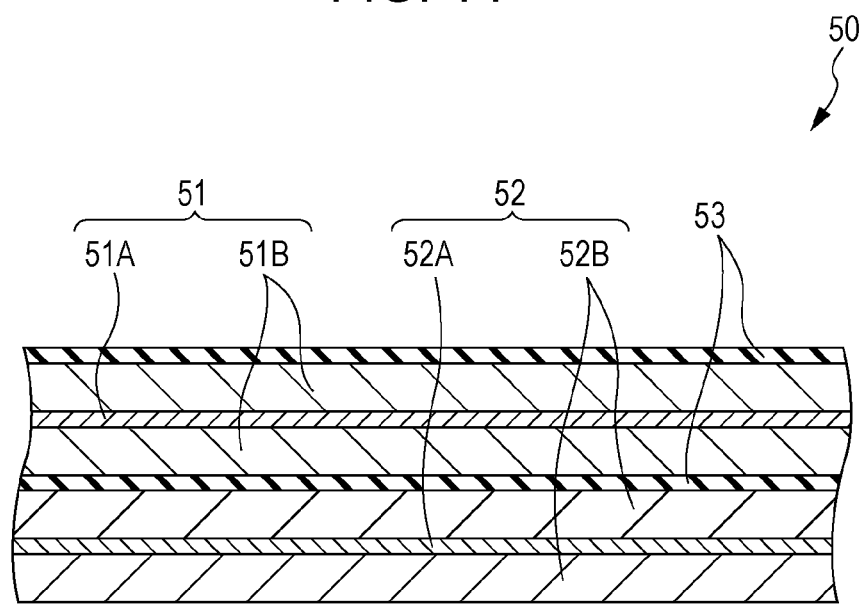
FIG. 14 is a sectional view illustrating an exemplary configuration of the secondary battery according to the embodiment of the invention.

FIG. 14 is a partially expanded diagram illustrating the wound electrode body 50 shown in FIG. 13.
Positive Electrode For example, the positive electrode 51 includes a positive electrode current collector 51A and positive electrode active material layers 51B disposed on both surfaces of the positive electrode current collector 51A. Moreover, the positive electrode 51 may have a region where the positive electrode active material layer 51B is present on only one surface of the positive electrode current collector 51A. The positive electrode current collector 51A is formed of a metal foil such as an aluminum (Al) foil.

The positive electrode active material layer 51B contains, for example, a positive electrode active material, a conductive material such as fibrous carbon or carbon black, and a binder such as polyvinylidene fluoride (PVdF). For example, secondary particles which are an aggregate of primary particles of a lithium phosphoric acid compound having olivine structure are used as the positive electrode active material. As the primary particles, a material with a relatively small particle diameter, that is, an average particle diameter of 1 μm or less and preferably 500 nm or less is used. Accordingly, a response area of the active material can be increased and a conductive property of the olivine-type compound oxide particles with a low conductive property can be improved according to the embodiment of the invention. In general, the primary particles are changed into the secondary particles and are used as the positive electrode active material.

An example of the lithium phosphoric acid compound having the olivine structure includes a compound oxide particle having the olivine crystal structure expressed by, for example, Chemical 1.

$$LiM_xPO_4 \qquad \text{Chemical 1}$$

(where M is at least one selected from a group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr) and x satisfies a relation of "0≤x≤1").

As the compound expressed by Chemical 1, $LiFePO_4$, $LiFe_{1-y}Me_yPO_4$, $LiFe_{1-y-z}Me1_yMe2_zPO_4$, $LiCoPO_4$, $LiCo_{1-y}Me_yPO_4$, or $LiMn_{1-y}Me_yPO_4$ (where Me, Me1, and Me2 is one selected from a group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr) and relations of "0<y<1 and 0<z<1" are satisfied) may be used.

The compound oxide particle having the olivine crystal structure may be used together with another positive electrode active material. The compound oxide particle having the olivine crystal structure preferably includes 5% or more by weight of the entire positive electrode active material in order to use the charging method according to the embodiment of the invention.

Figure 15:
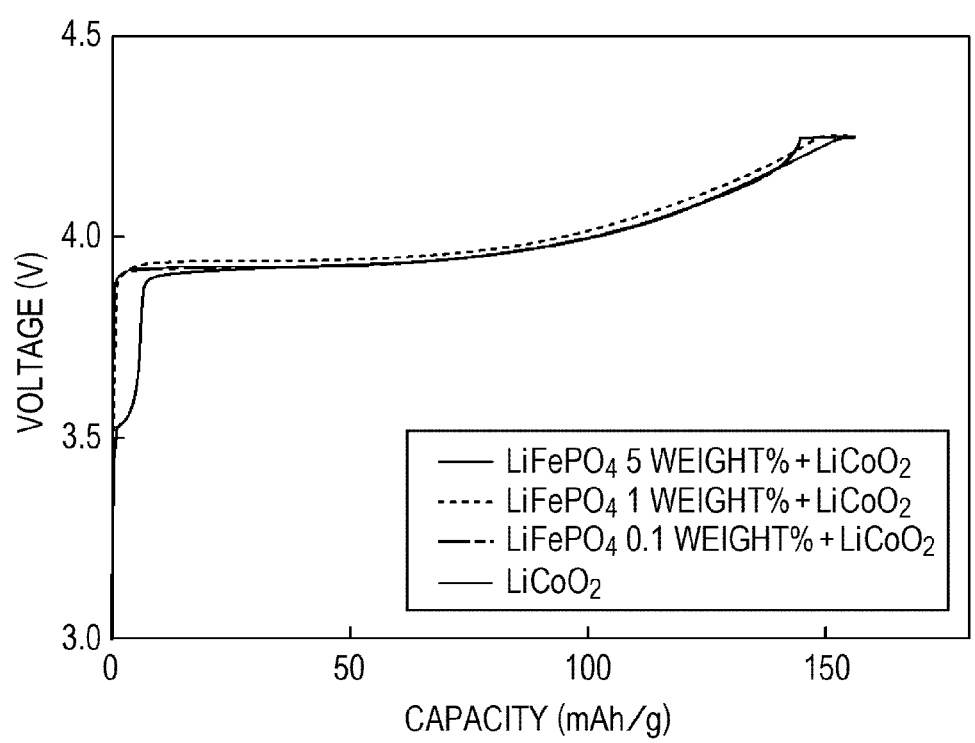
FIG. 15 is a graph illustrating a battery characteristic of a battery in which a mixture ratio between lithium iron phosphate and lithium cobaltate which is a positive electrode active material.

FIG. 15 is a diagram illustrating the charging characteristic of the secondary battery using positive electrode active materials with different mixture amounts of compound oxide particles having the olivine crystal structure. As in FIG. 15, when the positive electrode active material contains lithium iron phosphate ($LiFePO_4$) of 5% by weight having the olivine crystal structure, a voltage variation, which is to be detected according to the embodiment of the invention, is shown in the last period of constant charging and thus is preferable.

The charging characteristic shown in FIG. 15 is the charging characteristic of a coin-type battery and is the charging characteristic of other types of batteries. In FIG. 15, a solid line indicates the charging characteristic when using a positive electrode active material in which lithium iron phosphate ($LiFePO_4$) of 5% by weight having the olivine crystal structure and lithium cobaltate ($LiCoO_2$) of 95% by weight having a lamination structure are mixed with each other. A dot line indicates the charging characteristic when using a positive electrode active material in which lithium iron phosphate ($LiFePO_4$) of 1% by weight and lithium cobaltate ($LiCoO_2$)

of 99% by weight are mixed with each other. A chain line indicates the charging characteristic when using a positive electrode active material in which lithium iron phosphate (LiFePO$_4$) of 0.1% by weight and lithium cobaltate (LiCoO$_2$) of 99.9% by weight are mixed with each other. A thin line indicates the charging characteristic when only lithium cobaltate (LiCoO$_2$) is used.

A carbon material or the like may be supported on the surface of the lithium phosphoric acid compound in order to improve a conductive property.

The secondary particles are granulated by a generally used method such as a spray dry method. In the spray dry method, the secondary particles in which the primary particles coated with a carbon material by clearing a solvent instantaneously are aggregated can be formed by dispersing the primary particles together with, for example, the carbon original material in the solvent and spraying the primary particles under high temperature atmosphere. The narrow hole diameter of the secondary particle can be changed by adjusting the concentration of the solvent dispersing the primary particle and other granulation conditions.

As the conductive agent contained in the positive electrode active material, fibrous carbon is particularly preferably used. Since the fibrous carbon has a long diameter compared to a carbon material with a nearly spherical form, the contact point between the conductive agents can be further reduced compared to a case where the carbon material with nearly spherical form is used. Since the conductive agents are connected by a binder, the amount of binder on a conductive path is decreased by reducing the number of contacts and thus the increase in resistance can be suppressed. Therefore, by using the fibrous carbon, it is possible to improve the conductive property in a thickness direction of the positive electrode active material.

As the fibrous carbon, so-called vapor grown carbon fiber formed by, for example, a vapor phase method can be used. The vapor grown carbon fiber can be produced by implanting an organic compound gasified together with iron serving as a catalytic agent. As the vapor grown carbon fiber, a produced vapor grown carbon fiber itself, a vapor grown carbon that is subjected to heating at about 800° C. to about 1500° C., or a vapor grown carbon fiber that is subjected to graphitization at about 2000° C. to about 3000° C. may be used. However, the vapor grown carbon fiber subjected to heating or graphitization is preferably used since crystallization is in progress and thus characteristics of high conductivity and high pressure resistance can be obtained.

The average fiber length of the fibrous carbon is preferably in the range from 1 nm to 200 nm and more preferably in the range from 10 nm to 200 nm. Moreover, an aspect ratio calculated using the average fiber diameter and the average fiber length is preferably in the range from 20 to 20000 on average, more preferably in the range from 20 to 4000 on average, and further more preferably in the range from 20 to 2000.

When the thickness of the positive electrode active material is thickened to improve volumetric efficiency of a battery, carbon black or the like produced by forming secondary particles is preferably used as a conductive agent contained in a positive electrode active material layer. Since the longer diameter of the carbon material produced by forming secondary particles as a conductive agent is longer than the long diameter of the fibrous carbon and the contact point between the conductive agents is decreased, the conductive property can be prevented from deteriorating by the binder.

Negative Electrode

For example, the negative electrode 52 includes a negative electrode current collector 52A and negative electrode active material layers 52B disposed on both surfaces of the negative electrode current collector 52A. Moreover, the negative electrode 52 may have a region where the negative electrode active material layer 52B is present on only one surface of the negative electrode current collector 52A. The negative electrode current collector 52A is formed of a metal foil such as a copper (Cu) foil.

The negative electrode active material layer 52B contains, for example, a negative electrode active material and may contain another material, such as a conductive agent, a binder, or a viscosity modifier, which does not contribute to charging, as necessary. Examples of the conductive agent include a graphitic fiber, a metal fiber, and a metallic powder. Examples of the binder include fluoro-based polymer compounds such as polyvinylidene (PVdF) and synthetic rubbers such as styrene-butadiene rubber (SBR) or ethylene-propylene-diene rubber (EPDR).

The negative electrode active material contains at least one of the negative electrode materials capable of absorbing or releasing lithium (Li) electrochemically at a potential of 2.0 V or less of lithium metal.

Examples of the negative electrode materials capable of absorbing or releasing lithium (Li) include a carbon material, a metal compound, oxide, sulfide, lithium nitride such as LiN$_3$, lithium metal, metal forming an alloy together with lithium, and a polymer material.

Examples of the carbon material include non-graphitizable carbon, easily graphitizable carbon, graphite, pyrolytic carbons, cokes, glassy carbons, an organic polymer compound baked body, carbon fiber, and activated carbon. Examples of the cokes include pitch coke, needle coke, and petroleum coke. The organic polymer compound baked body is a body carbonized by baking a polymer material such as a phenol resin or a furan resin at an appropriate temperature. A part of the organic polymer compound baked bodies may be classified to non-graphitizable carbon or easily graphitizable carbon. Examples of the polymer material include polyacetylene or polypyrrole.

The negative electrode material capable of absorbing or releasing lithium (Li) is preferably a material in which a charging/discharging potential is relatively close to lithium metal. This is because higher energy density can be easily realized as the charging/discharging potential of the negative electrode 52 is lower. The carbon material is preferably used since a crystal structure change caused during charging/discharging time is very small, high charging/discharging capacity can be obtained, and a good cycle characteristic can be obtained. In particular, graphite is preferably used, since the electrochemical equivalent thereof is high and high energy density can be obtained. Moreover, non-graphitizable carbon is preferably used, since an excellent cycle characteristic can be obtained.

Examples of the negative electrode material capable of absorbing or releasing lithium (Li) include a single substance, an alloy, and a compound of a metal element or a semimetal element capable of forming an alloy with a lithium metal single substance or lithium (Li). These materials are preferably used, since high energy density can be obtained. In particular, when these materials are used together with a carbon material, high energy density can be obtained and an excellent cycle characteristic can be obtained. Therefore, these materials are preferably used. In the specification, an alloy includes two or more kinds of metal elements, one or more kind of metal element, and one or more kind of semimetal element. The composition of the alloy has a solid solution, an eutectic (eutectic compound), an intermetallic compound, or two or more thereof.

Examples of the metal element or the semimetal element include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), sliver (Ag), zirconium (Zr), yttrium (Y), and hafnium (Hf). An alloy or a compound thereof has, for example, a chemical formula $Ma_fMb_gLi_h$ or a chemical formula $Ma_sMc_tMd_u$. In the chemical formulae, Ma indicates at least one of metal elements and semimetal elements capable of producing an alloy with lithium, Mb indicates at least one of metal elements and semimetal elements other than lithium and Ma, Mc indicates at least one of non-metal elements, Md indicates at least one of metal elements and semimetal elements other than Ma, and the values of f, g, h, s, t, and u satisfy "f>0", "g≥0", "h≥0", "s>0", "t>0", and "u≥0", respectively.

Among them, a single body, an alloy, or a compound of the metal elements or semimetal elements of Group 4B of the short period type periodic table is preferably used. In particular, silicon (Si), tin (Sn), an alloy thereof, or a compound thereof is more preferable. In addition, silicon (Si), tin (Sn), an alloy thereof, or a compound thereof may have an amorphous crystalline structure.

Examples of the negative electrode material capable of absorbing or releasing lithium further include oxide, sulfide, and lithium nitride such as $LiN_3$. Examples of the oxide include $MnO_2$, $V_2O_5$, $V_6O_{13}$, NiS, and MoS. In addition, examples of the oxide capable of absorbing or releasing lithium at relatively low potential include iron oxide, ruthenium oxide, molybdenum oxide, tungsten oxide, titanium oxide, and tin oxide. Examples of the sulfide include NiS and MoS.

Separator

Examples of the separator 53 include a polyethylene porous film, a polypropylene porous film, and a synthetic resin fabric. A non-aqueous electrolytic solution which is a liquid electrolyte is impregnated to the separator 53.

Non-Aqueous Electrolyte Solution

The non-aqueous electrolyte solution contains a liquid solvent, for example, a non-aqueous solvent such as an organic solvent, and electrolyte salt dissolved in the non-aqueous solvent.

The non-aqueous solvent preferably contains at least one of cyclic carbonates such as ethylene carbonate (EC) and propylene carbonate (PC). This is because the cycle characteristic can be improved. In particular, when ethylene carbonate (EC) and propylene carbonate (PC) are mixed and included in the non-aqueous solvent, the cycle characteristic can be improved and thus the non-aqueous solvent is preferably used.

In addition, the non-aqueous solvent preferably contains at least one of chain carbonate ester such as diethyl carbonate (DEC), dimethyl carbonate (DMC), ehylmethyl carbonate (EMC), and methylpropyl carbonate (MPC). This is because the cycle characteristic can be improved.

In addition, the non-aqueous solvent preferably contains at least one of 2,4-difluoroanisole and vinylene carbonate (VC). This is because 2,4-difluoroanisole can improve a discharging capacity and vinylene carbonate (VC) can further improve the cycle characteristic. In particular, when the non-aqueous solvent contains 2,4-difluoroanisole and vinylene carbonate, both the discharging capacity and the cycle characteristic can be improved and thus 2,4-difluoroanisole and vinylene carbonate are preferably used.

In addition, the non-aqueous solvent may include at least one of butylenes carbonate, γ-butyrolactone, γ-valerolactone, a substance formed by substituting some or all of hydrogen groups of these compounds by fluorine groups, 1,2-dimethoxyethane, tetrahydrofuran, 2-methyltetrahydrofuran, 1,3-dioxolan, 4-methyl-1,3-dioxolan, methyl acetate, methyl propionate, acetonitrile, glutaronitrile, adiponitrile, methoxyacetonitrile, 3-methoxypropionitrile, N,N-dimethyformamide, N-methylpyrrolidinone, N-methyloxazolidinone, N,N-dimethyloxazolidinone, nitromethane, nitroehane, sulfolane, demethyle sulfoxide, and trimethyle phosphate.

Depending on the combined electrodes, reversibility of the electrode reaction is sometimes improved by using a material formed by substituting a part or all of the hydrogen atoms of a substance contained in the non-aqueous solvent group. Accordingly, this material can be appropriately used.

A lithium salt can be used as the electrolyte salt. Examples of the lithium salt include an inorganic lithium salt such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$), or lithium tetrachloroaluminate ($LiAlCl_4$) and perfluroalkane sulfonic acid derivatives such as lithium trifluoromethanesulfonate ($LiCF_3SO_3$), lithium bis(trifluoromethanesulfonyl)imide ($LiN(CF_3SO_2)_2$), lithium bis(pentafluoromethanesulfonyl)imide ($LiN(C_2F_5SO_2)_2$), or lithium tris(trifluoromethanesulfonyl)methide ($LiC(CF_3SO_2)_3$). One kind of thereof may be used singly be used, or two or more kinds of thereof may be combined and used. Among them, lithium hexafluorophosphate ($LiPF_6$) is preferably used since high ion conductivity can be obtained and the cycle characteristic can be improved.

3-2 Configuration of Battery Pack

In the battery pack 1, the above-described secondary batteries 10a are connected to each other in series and the protective circuit 20 is connected.

Figure 16:
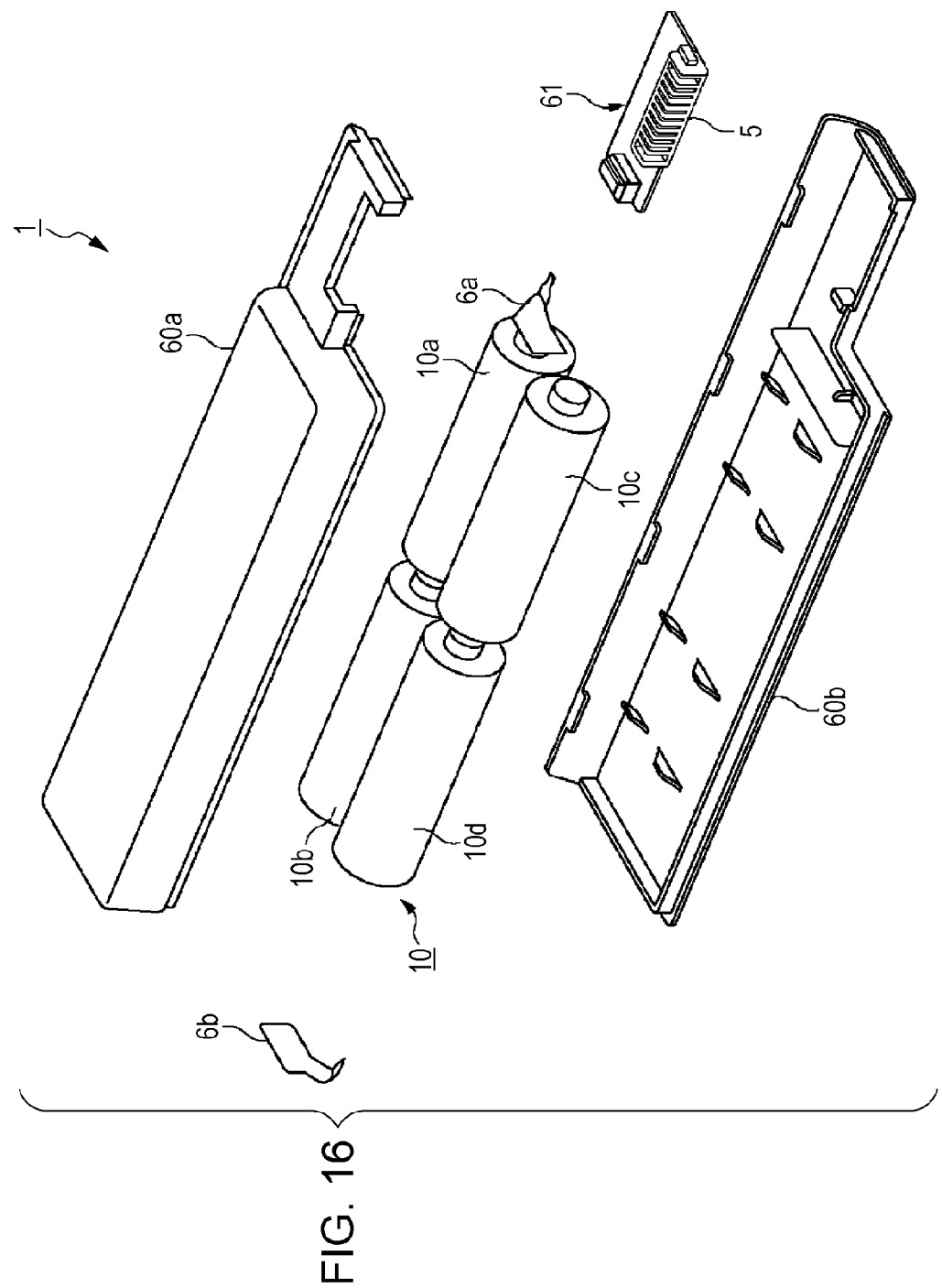
FIG. 16 is an exploded perspective view illustrating an exemplary configuration of a battery pack according to an embodiment of the invention.

FIG. 16 is an exploded perspective view illustrating an exemplary configuration of the battery pack 1 according to an embodiment of the invention. The battery pack 1 uses, for example, four secondary batteries 10a to 10d and is configured so that the battery assembly 10 is formed by sequentially connecting the secondary batteries 10a to 10d in series.

For example, a connection plate 6a is disposed on a positive terminal of the battery assembly 10 formed by the secondary batteries 10a to 10d connected to each other in series and the battery assembly 10 and the connection plate 6a are electrically connected to each other. As shown in FIG. 16, the connection plate 6a is electrically connected to a circuit board 61 having the protective circuit 20.

A connection plate 6b is disposed on a negative terminal of the battery assembly 10 and the battery assembly 10 and the connection plate 6b are electrically connected to each other. The connection plate 6b is electrically connected to the circuit board 61.

The circuit board 61 includes a connector 5 to connect an electronic apparatus and the battery pack 1 to each other. The connector 5 is configured so as to be exposed to the outside of the battery pack 1 and includes a positive terminal 2a, a negative terminal 2b, a communication terminal 3, and voltage monitor terminals 4a to 4d. The connector 5 is fitted to a connector of the charger 30 or an electronic apparatus so that the charger 30 or the electronic apparatus is electrically connected to the battery pack 1.

The circuit board 61 including the battery assembly 10, the connection plates 6a and 6b, the protective circuit 20, and the connector 5 is accommodated in an external case including an upper case 60a and a lower case 60b. The upper case 60a and the lower case 60b are formed of, for example, a plastic mold case. A concave portion is formed in at least one of the upper case 60a and the lower case 60b to expose the connector 5 to the outside of the battery pack 1 when the upper case 60a and the lower case 60b are fitted to each other.

Although the embodiments of the invention have been described in detail, the invention is not limited to the above-described embodiments, but may be modified in various forms within the scope of the technical spirit of the invention.

For example, even when a compound material having an abrupt voltage variation in the charging last period described above is used as a compound material other than the compound oxide particle having the olivine crystal structure, the charge termination can be detected by the same method as that of the embodiments of the invention. The numerical values exemplified in the above-described embodiments are just examples and other numerical values may be used, as necessary. Since the determination criterion of the battery state is different according to the kinds of secondary batteries, appropriate criterion values are set according to a secondary battery to be used.

An arbitrary configuration may be used as the configuration of the battery pack.

The present application contains subject matter related to that disclosed in Japanese Priority Patent Application JP 2010-103237 filed in the Japan Patent Office on Apr. 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery charging method comprising the step of:
   determining whether to perform one of a first charging control method of performing constant current charging and constant voltage charging and a second charging control method of performing only the constant current charging according to information stored in a plurality of secondary batteries which includes a compound oxide particle with an olivine crystal structure as a positive electrode active material and are connected to each other in series,
   wherein the first charging control method includes the steps of
   performing the constant current charging of the secondary batteries until the voltages of the plurality of secondary batteries connected to each other in series become a predetermined battery voltage,
   performing the constant voltage charging after the voltages of the secondary batteries become the predetermined battery voltage,
   determining whether voltage variation amounts of the plurality of secondary batteries are a value equal to or greater than a first set value within a first predetermined time by measuring the voltage variation amounts of the plurality of secondary batteries after the constant voltage charging starts, and
   storing information used to select the second charging control method in the secondary battery and firstly terminating the charging when it is determined that the voltage variation amount of at least one of the plurality of secondary batteries is the value equal to or greater than the first set value within the first predetermined time in the step of determining whether the voltage variation amounts of the plurality of secondary batteries are the value equal to or greater than the first set value within the first predetermined time, and
   wherein the second charging control method includes the steps of
   starting the constant current charging of the plurality of secondary batteries connected to each other in series, and
   secondly terminating the constant current charging when the voltage variation amount of at least one of the plurality of secondary batteries is a value equal to or greater than a second set value within a second set time.

2. The secondary battery charging method according to claim 1, wherein in the step of determining whether the voltage variation amounts of the plurality of secondary batteries are the value equal to or greater than the first set value within the first predetermined time in the first charging control method, it is determined whether the voltage variation amount of at least one of the plurality of secondary batteries is the value equal to or greater than the first set value within the first predetermined time.

3. The secondary battery charging method according to claim 1, wherein in the step of determining whether the voltage variation amounts of the plurality of secondary batteries is the value equal to or greater than the first set value within the first predetermined time in the first charging control method, it is determined whether an average value of the voltage variation amounts of the plurality of secondary batteries is the value equal to or greater than the first set value within the first predetermined time.

4. The secondary battery charging method according to any one of claims 1 to 3, wherein the second set time does not include a start time of the constant current charging in the second charging control method.

5. The secondary battery charging method according to claim 1, wherein the first charging control method further includes the steps of
   determining whether the voltage variation amounts of the secondary batteries are a value equal to or greater than the first set value within a second predetermined time longer than the first predetermined time by measuring the voltage variation amounts of the plurality of secondary batteries after the constant voltage charging starts, and
   storing information used to select the second charging control method in the secondary battery and thirdly terminating the charging when it is determined that the voltage variation amount of at least one of the plurality of secondary batteries is the value equal to or greater than the first set value within the second predetermined time in the step of determining whether the voltage variation amounts of the plurality of secondary batteries are the value equal to or greater than the first set value within the first predetermined time.

* * * * *